(12) United States Patent
Kamon

(10) Patent No.: US 11,014,251 B2
(45) Date of Patent: May 25, 2021

(54) JOINT STRUCTURE FOR ROBOT

(71) Applicant: KAWASAKI JUKOGYO KABUSHIKI KAISHA, Kobe (JP)

(72) Inventor: Masayuki Kamon, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 24 days.

(21) Appl. No.: 16/464,025

(22) PCT Filed: Nov. 24, 2017

(86) PCT No.: PCT/JP2017/042233
§ 371 (c)(1),
(2) Date: May 24, 2019

(87) PCT Pub. No.: WO2018/097249
PCT Pub. Date: May 31, 2018

(65) Prior Publication Data
US 2019/0381677 A1    Dec. 19, 2019

(30) Foreign Application Priority Data

Nov. 24, 2016 (JP) .............................. JP2016-228123

(51) Int. Cl.
*B25J 17/00* (2006.01)
*B25J 9/10* (2006.01)
(Continued)

(52) U.S. Cl.
CPC .............. *B25J 17/00* (2013.01); *B25J 9/102* (2013.01); *B25J 9/123* (2013.01); *F16H 25/20* (2013.01); *F16H 2025/204* (2013.01); *F16H 2025/2031* (2013.01); *F16H 2025/2046* (2013.01); *F16H 2025/2081* (2013.01)

(58) Field of Classification Search
CPC .... B25J 17/00; B25J 17/0241; B25J 17/0258; B25J 9/106; B25J 9/123; B25J 9/102; A61F 2/64; A61F 2/66; A61F 2/6607; F16H 21/40; F16H 25/20; F16H 2025/2031;
(Continued)

(56) References Cited

U.S. PATENT DOCUMENTS

2004/0049290 A1    3/2004 Bedard
2005/0192677 A1    9/2005 Ragnarsdottir et al.
(Continued)

FOREIGN PATENT DOCUMENTS

JP      01244746 A  *  9/1989  ............... A61F 2/64
JP    2005-536317 A    12/2005
(Continued)

*Primary Examiner* — Prasad V Gokhale
(74) *Attorney, Agent, or Firm* — Oliff PLC

(57) ABSTRACT

A joint structure for a robot includes a first link and a second link rotatably coupled to each other through a joint part and a linear-motion actuator coupling the first link to the second link at a part separated from the joint part. The linear-motion actuator has a casing, and a pair of first shaft parts integrally formed with an outer surface of the casing. The first link is supported by the first shaft part so as to be pivotable with respect to the linear-motion actuator. The first link relatively pivots to the second link by the linear-motion actuator reciprocating.

4 Claims, 10 Drawing Sheets

(51) Int. Cl.
*B25J 9/12* (2006.01)
*F16H 25/20* (2006.01)

(58) Field of Classification Search
CPC ....... F16H 2025/204; F16H 2025/2081; F16H 2025/2046; H02K 7/06
See application file for complete search history.

(56) References Cited

U.S. PATENT DOCUMENTS

| | | | | |
|---|---|---|---|---|
| 2014/0330393 | A1* | 11/2014 | Ward | A61F 2/66 623/24 |
| 2015/0352727 | A1* | 12/2015 | Sato | B25J 17/00 74/490.05 |
| 2017/0367852 | A1* | 12/2017 | Kazerooni | B25J 9/106 |
| 2018/0031092 | A1* | 2/2018 | Daniel | F16H 25/2418 |

FOREIGN PATENT DOCUMENTS

| | | | |
|---|---|---|---|
| JP | 2007-524483 | A | 8/2007 |
| JP | 2011-185328 | A | 9/2011 |
| JP | 2013-091145 | A | 5/2013 |

* cited by examiner

JOINT STRUCTURE FOR ROBOT

TECHNICAL FIELD

The present disclosure relates to a joint structure for a robot.

BACKGROUND ART

It is known that a first link is coupled to a second link through a joint part, and robots are provided with a linear-motion actuator which pivots the second link with respect to the first link (e.g., see Patent Document 1). The robot disclosed in Patent Document 1 includes an electric motor, a nut member which is driven to be rotated by the electric motor through a belt, a threaded shaft which threadedly engages with the nut member, and a casing which accommodates the nut member.

Moreover, in the robot disclosed in Patent Document 1, a pivot shaft provided to the first link is fitted into a bearing member which is attached to a through-hole formed in the casing. Thus, the casing is supported by the first link so as to be pivotable about the axial center of the pivot.

REFERENCE DOCUMENT OF CONVENTIONAL ART

Patent Document

[Patent Document 1] JP2011-185328A

DESCRIPTION OF THE DISCLOSURE

Problem to be Solved by the Disclosure

However, in the robot disclosed in Patent Document 1, since the bearing member is attached to the through-hole formed in the casing, the pivot shaft is supported by the magnitude of the depth (length) of the through-hole, therefore, the strength may become insufficient. On the other hand, if the depth of the through-hole is extended in order to fully secure the strength, the thickness of the casing increases, and this results in the linear-motion actuator, i.e., the robot, increasing in the size. Therefore, there is still room for an improvement.

The present disclosure is made in view of addressing the conventional situations, and one purpose thereof is to provide a joint structure for a robot having a linear-motion actuator which couples a first link to a second link, which can fully secure the strength of a shaft part (first shaft part) which pivotably supports the first link, and can reduce the size of the robot.

SUMMARY OF THE DISCLOSURE

In order to solve the conventional problem, a joint structure for a robot according to one aspect of the present disclosure includes a first link and a second link rotatably coupled to each other through a joint part and a linear-motion actuator coupling the first link to the second link at a part separated from the joint part. The linear-motion actuator has a casing, and a pair of first shaft parts integrally formed with an outer surface of the casing. The first link is supported by the first shaft part so as to be pivotable with respect to the linear-motion actuator. The first link relatively pivots to the second link by the linear-motion actuator reciprocating.

Thus, the strength of the first shaft part which supports the first link can fully be secured. Moreover, the thickness of the casing can be reduced, and the size of the robot can be reduced.

Effect of the Disclosure

According to the joint structure for the robot of the present disclosure, the strength of the second shaft part which pivotably supports the second link can fully be secured, and the size of the robot can be reduced.

MODES FOR CARRYING OUT THE DISCLOSURE

Figure 1:
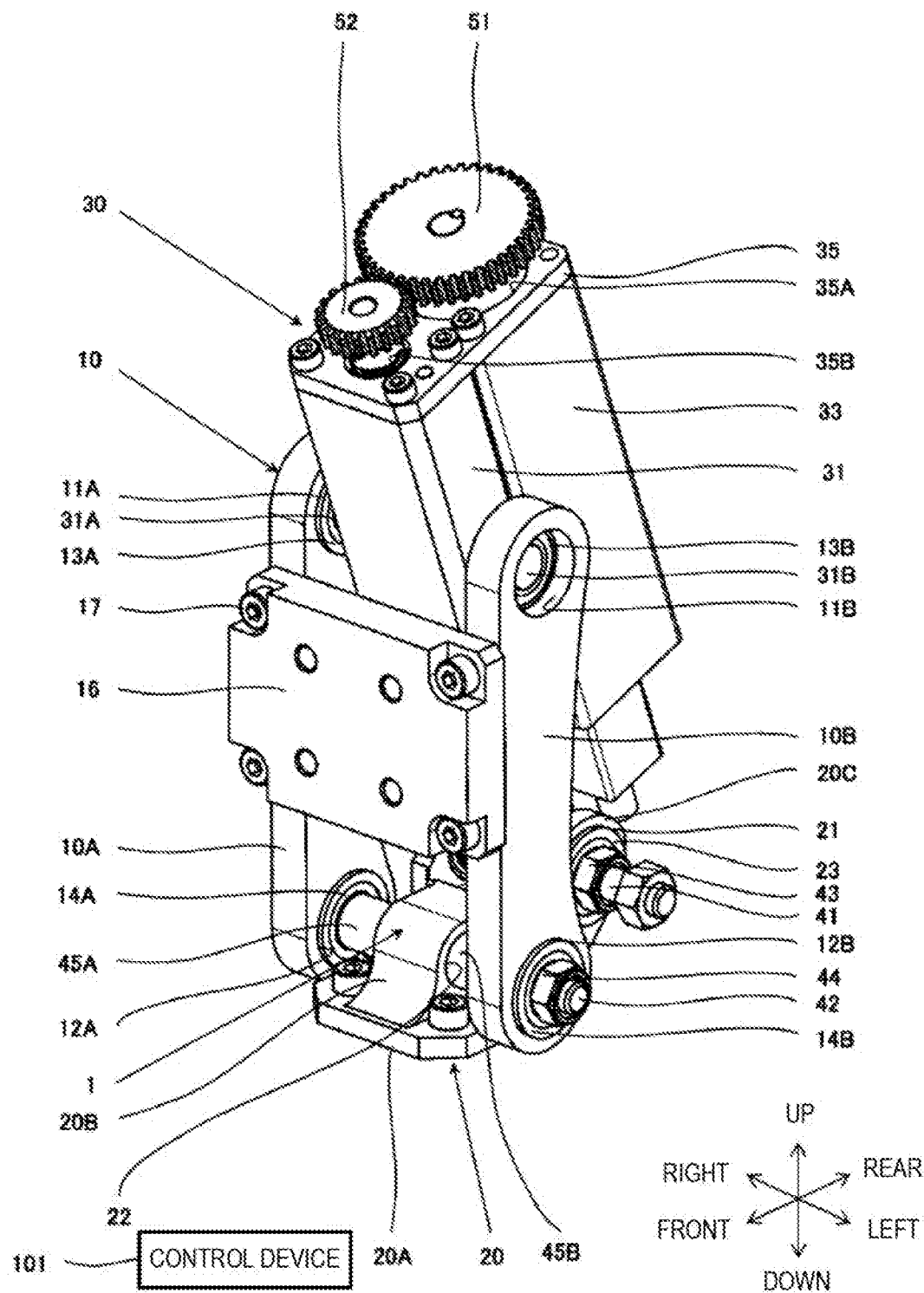
FIG. 1 is a perspective view illustrating an outline structure of a joint structure for a robot according to Embodiment 1.

Hereinafter, embodiments of the present disclosure will be described with reference to the drawings. Note that the same reference characters are given to the same or corresponding components throughout the drawings to omit redundant description. Moreover, throughout the drawings, the components illustrating the present disclosure are selectively illustrated, and illustration of other components may be omitted. Further, the present disclosure is not limited to the following embodiments.

Embodiment 1

A joint structure for a robot according to Embodiment 1 includes a first link and a second link which are coupled to each other so as to be rotatable through a joint part, and a linear-motion actuator which couples the first link to the second link at a part separated from the joint part. The linear-motion actuator includes a casing, a shaft member which linearly moves relatively in an axial center direction with respect to the casing, and a pair of first shaft parts which are disposed so that the axial centers are located on the axial center of the shaft member, and are integrally formed with an outer surface of the casing. The first link is supported by the first shaft part so as to be pivotable with respect to the linear-motion actuator, and pivots relatively to the second link when the linear-motion actuator moves.

Alternatively, in the joint structure for the robot according to Embodiment 1, the first link may have a pair of first link members, and the pair of first link members may be disposed so as to pinch the casing of the linear-motion actuator from both sides.

Alternatively, in the joint structure for the robot according to Embodiment 1, through-holes may be formed in the first link members, bearing members may be disposed in the through-holes, and the first link may be pivotably supported by the first shaft parts through the bearing members.

Alternatively, in the joint structure for the robot according to Embodiment 1, the casing may accommodate the shaft member.

Hereinafter, one example of the joint structure for the robot according to Embodiment 1 will be described with reference to FIGS. 1 to 8.

[Structure of Robot]

Figure 2:
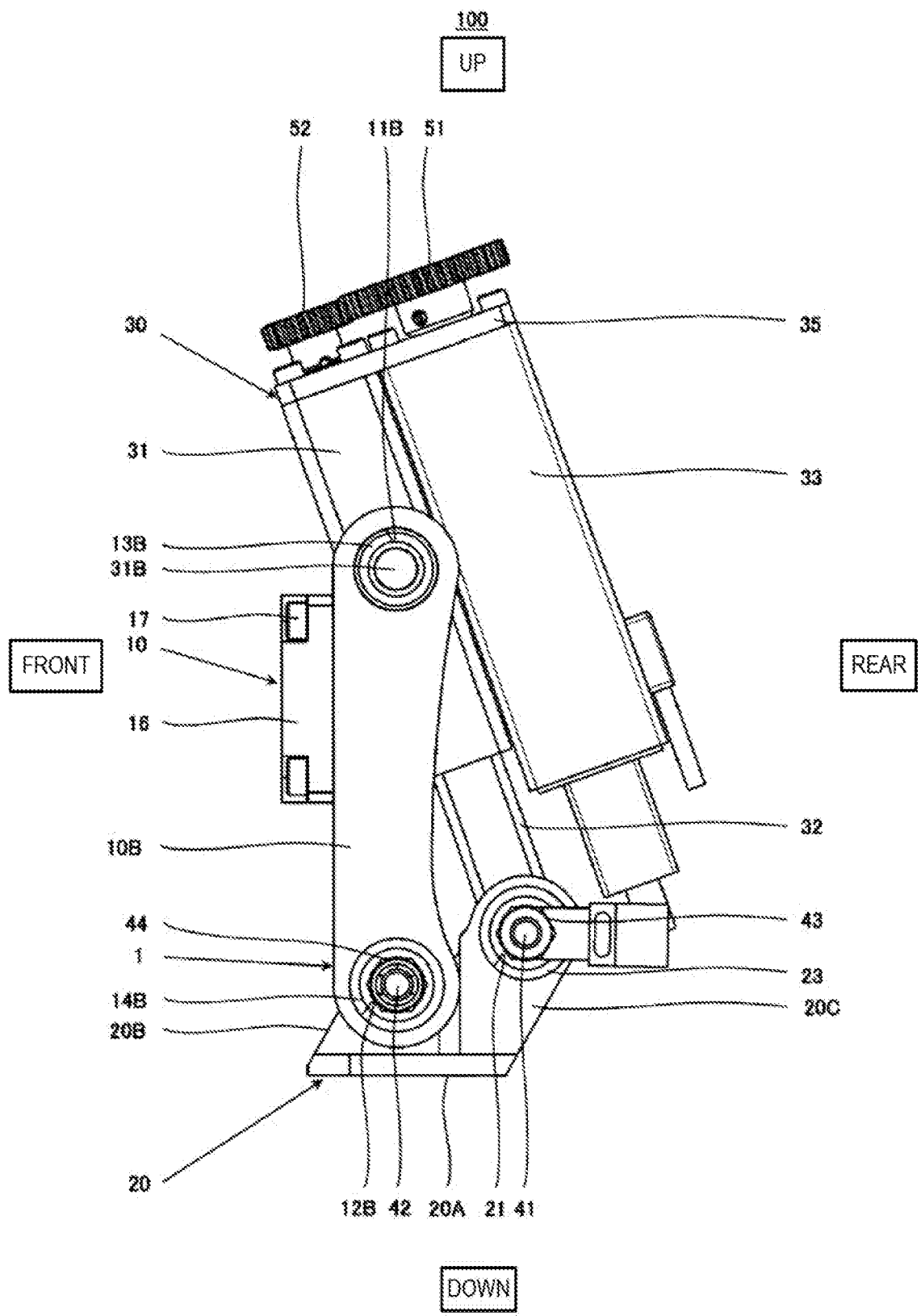
FIG. 2 is a side view of the joint structure for the robot illustrated in FIG. 1.
Figure 3:
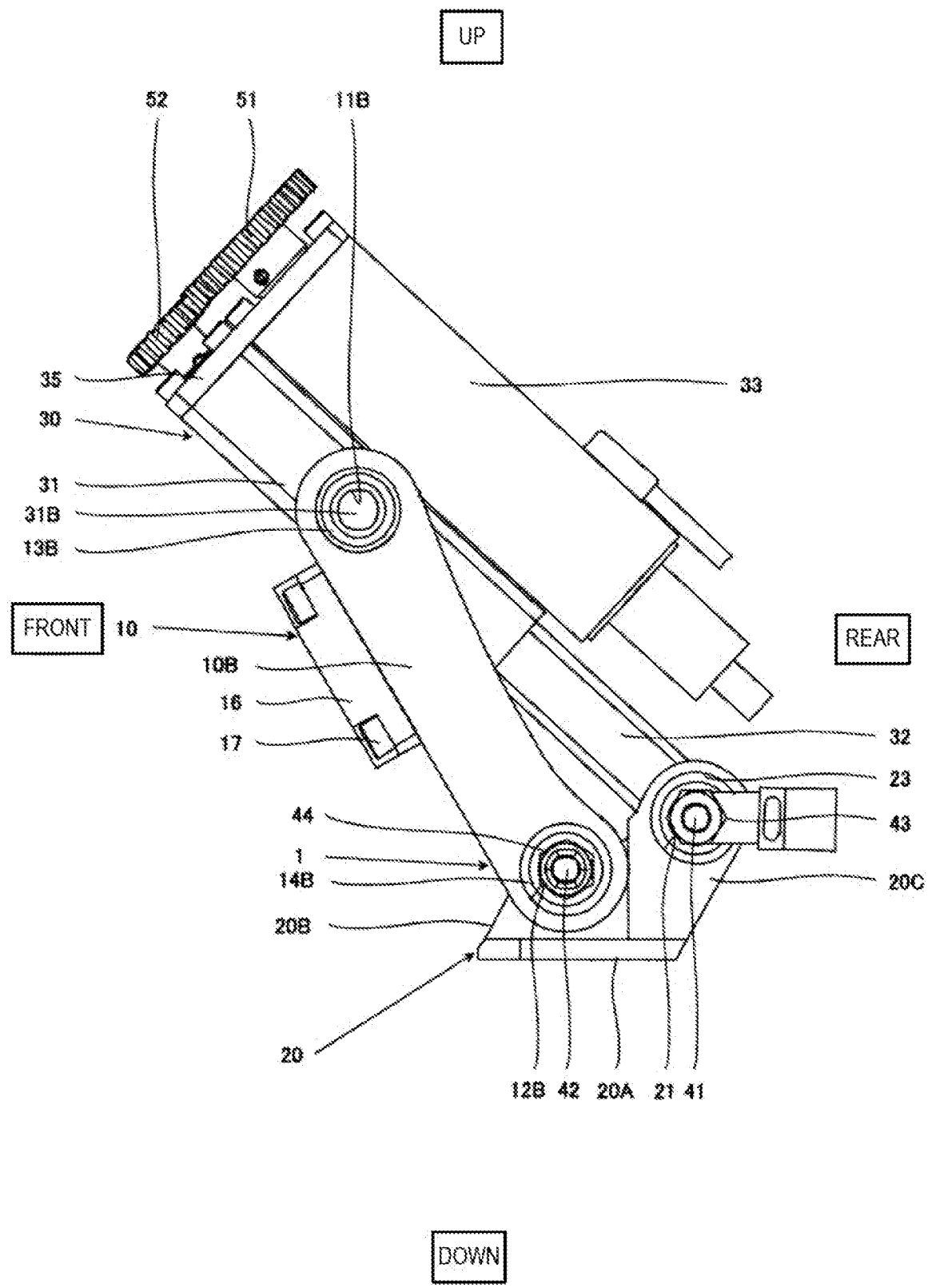
FIG. 3 is a side view of the joint structure for the robot illustrated in FIG. 1.
Figure 4:
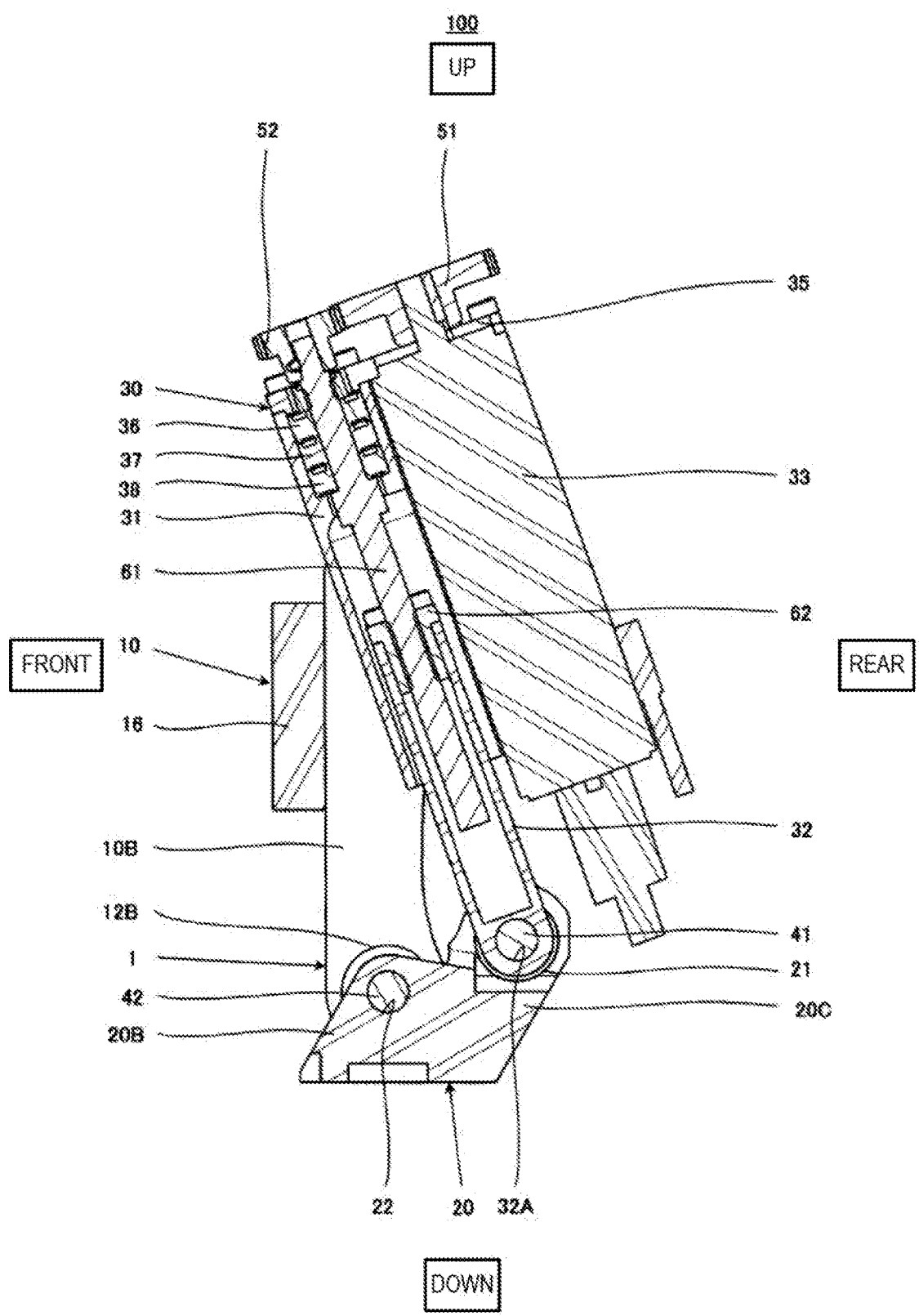
FIG. 4 is a vertical cross-sectional view of the joint structure for the robot illustrated in FIG. 1.

FIG. 1 is a perspective view illustrating an outline structure of the joint structure for the robot according to Embodiment 1. FIGS. 2 and 3 are side views of the joint structure for the robot illustrated in FIG. 1. FIG. 2 illustrates a state where the second link stands up, and FIG. 3 illustrates a state where the second link inclines. FIG. 4 is a vertical cross-sectional view of the joint structure for the robot illustrated in FIG. 1.

Note that, in FIG. 1, an up-and-down direction, a front-and-rear direction, and a left-and-right direction of the joint structure for the robot represent an up-and-down direction, a front-and-rear direction, and a left-and-right direction in the figure, respectively. In FIGS. 2 to 4, the up-and-down direction and the front-and-rear direction of the joint structure for the robot represent an up-and-down direction and a front-and-rear direction in the figures, respectively.

As illustrated in FIGS. 1 to 4, the joint structure 100 for the robot according to Embodiment 1 includes a first link 10, a second link 20, a linear-motion actuator 30, and a control device 101. The first link 10 pivots relatively to the second link 20 as the linear-motion actuator 30 carries out a reciprocating operation. The first link 10 is pivotably coupled to the second link 20 through a joint part 1. In addition, the linear-motion actuator 30 couples the first link 10 to the second link 20 at a part separated from the joint part 1.

Note that, in the joint structure 100 of the robot according to Embodiment 1, for example, the first link 10 may constitute a head part of the robot, and the second link 20 may constitute a body part of the robot, and the joint part 1 may constitute a neck joint of the robot. Alternatively, the first link 10 may constitute a lower thigh part of the robot, the second link 20 may constitute a thigh part of the robot, and the joint part 1 may constitute a knee joint of the robot. Alternatively, the control device 101 may be disposed at the head part of the robot, or may be disposed at the body part, or may be disposed inside a third casing 33 of the linear-motion actuator 30, which will be described later.

The first link 10 has a pair of first link members 10A and 10B, a plate-shaped stationary member 16, and bolts 17. The first link member 10A and the first link member 10B are disposed on both sides of a first casing 31 of the linear-motion actuator 30, which will be described later. The stationary member 16 is disposed so as to bridge between the first link members 10A and 10B, and is fixed to the first link members 10A and 10B with the bolts 17.

Note that, if the first link 10 constitutes, for example, the head of the robot, the head part of the robot may be attached to the stationary member 16, or the head part of the robot may be directly fixed to the first link members 10A and 10B, without providing the stationary member 16.

Here, the first link member 10A is formed in a substantially strip shape. Moreover, a first through-hole 11A is formed in a tip-end part (in FIG. 1 and other figures, an upper end part) of a principal surface of the first link member 10A, and a second through-hole 12A is formed in a base-end part (in FIG. 1 and other figures, a lower end part) of the principal surface of the first link member 10A. A bearing member 13A is fitted into the first through-hole 11A, and a bearing member 14A is fitted into the second through-hole 12A. Note that the bearing member 13A may be a ball bearing, and the bearing member 14A may be a radial bearing.

The first link member 10B is constructed similar to the first link member 10A, and a first through-hole 11B and a second through-hole 12B are formed in both end parts of the principal surface. A bearing member 13B is fitted into the first through-hole 11B, and a bearing member 14B is fitted into the second through-hole 12B. Note that the bearing member 13B may be a ball bearing, and the bearing member 14B may be a radial bearing.

A first shaft part 31A of the linear-motion actuator 30 which will be described later is inserted into the first through-hole 11A of the first link member 10A through the bearing member 13A. Moreover, a first shaft part 31B of the linear-motion actuator 30 which will be described later is inserted into the first through-hole 11B of the first link member 10B through the bearing member 13B. Thus, the first link member 10A is pivotably supported by the first shaft part 31A, and the first link member 10B is pivotably supported by the first shaft part 31B.

The second link 20 has a base part 20A formed in a plate shape, a stepped part 20B, and wall parts 20C. The stepped part 20B is formed in a front part on an upper surface of the base part 20A, and the wall parts 20C are formed in a rear part on the upper surface of the base part 20A. Note that, in Embodiment 1, two wall parts 20C stand so as to pinch a second casing 32 of the linear-motion actuator 30 which will be described later therebetween.

A first through-hole 21 is formed in the wall part 20C so that an axial center is oriented horizontally (here, the left-and-right direction). Moreover, a second through-hole 22 is formed in the stepped part 20B so that an axial center is oriented horizontally (here, the left-and-right direction) (see FIG. 4). That is, the first through-hole 21 and the second through-hole 22 are formed so that their axial centers become parallel to each other.

Moreover, a cylindrical collar 45A is provided between the right surface of the stepped part 20B and the left surface of the first link member 10A. Similarly, a cylindrical collar 45B is provided between the left surface of the stepped part 20B and the right surface of the first link member 10B. For example, the collars 45A and 45B are disposed so that their axial centers are coaxial with the axial center of the second through-hole 22. Thus, the wobble of the first link members 10A and 10B in the left-and-right direction is reduced.

A bearing member 23 is fitted into the first through-hole 21. Note that the bearing member 23 may be a radial bearing.

A first shaft member 41 is inserted into the first through-hole 21 through the bearing member 23. Note that the first shaft member 41 is fittedly inserted into the through-hole 32A formed in the second casing 32 of the linear-motion actuator 30 which will be described later. Thus, the linear-motion actuator 30 is pivotably supported by the first shaft member 41.

The first shaft member 41, the bearing member 23, and the second casing 32 are fastened together with a nut member 43. Note that, in Embodiment 1, although the first shaft member 41 is inserted into the first through-hole 21 through the bearing member 23, it is not limited to this structure. For example, a pair of shaft parts may be provided to an outer surface of the second casing 32, and the shaft part may be inserted into the first through-hole 21.

On the other hand, a second shaft member 42 is inserted into the second through-hole 22. The second shaft member 42 is inserted into the collar 45A, and is inserted into the second through-hole 12A of the first link member 10A through the bearing member 14A. Moreover, the second shaft member 42 is inserted into the collar 45B, and is inserted into the second through-hole 12B of the first link member 10B through the bearing member 14B.

The second shaft member 42, the collars 45A and 45B, the first link members 10A and 10B are fastened together with a nut member 44, and these members constitute the joint part 1.

Note that, in Embodiment 1, although the second shaft member 42 is inserted into the second through-holes 12A and 12B through the bearing members 14A and 14B, it is not limited to this structure. For example, a pair of shaft parts may be provided to the outer surface of the stepped part 20B, and the shaft parts may be inserted into the second through-holes 12A and 12B.

The linear-motion actuator 30 includes the first casing 31, the second casing 32, the third casing 33, a drive motor (not illustrated) accommodated in the third casing 33, a first rotary transmission member 51, a second rotary transmission member 52, a ball screw mechanism having a threaded shaft 61 and a nut member 62. The rotation of the drive motor is transmitted to the threaded shaft 61 through the first rotary transmission member 51 and the second rotary transmission member 52, and the rotation of the threaded shaft 61 reciprocates the nut member 62.

Here, the linear-motion actuator 30 will be described in detail with reference to FIGS. 5 to 7.

Figure 5:
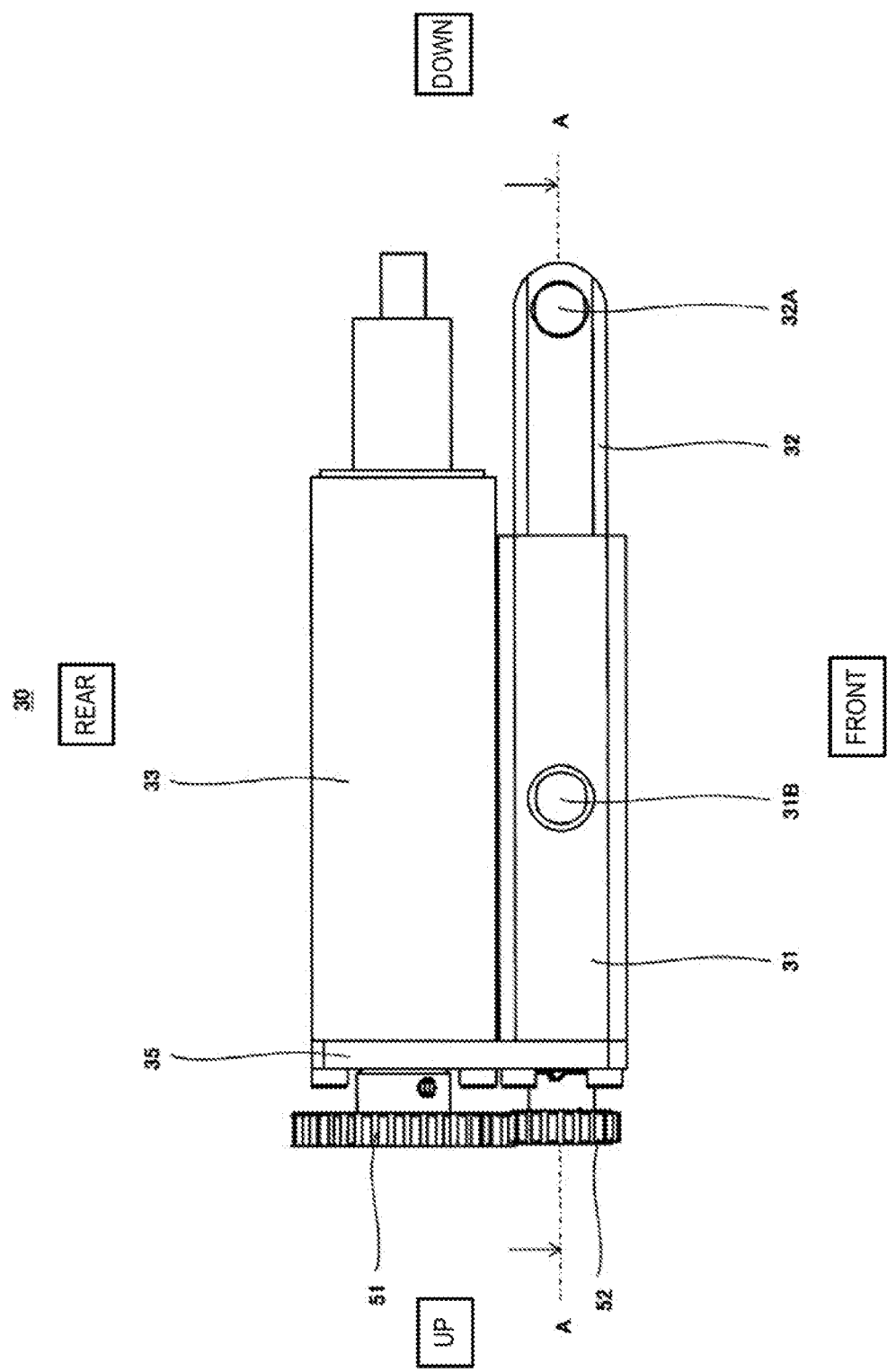
FIG. 5 is a left side view schematically illustrating an outline structure of a linear-motion actuator in the joint structure for the robot illustrated in FIG. 1.

FIG. 5 is a left side view schematically illustrating an outline structure of the linear-motion actuator in the joint structure for the robot illustrated in FIG. 1. FIG. 6 illustrates an upper surface of the linear-motion actuator illustrated in FIG. 5. FIG. 7 is a cross-sectional view taken along a line A-A in FIG. 5. Note that, in FIG. 5, an up-and-down direction and a front-and-rear direction of the linear-motion actuator are expressed as an up-and-down direction and a front-and-rear direction in the figure, and in FIGS. 6 and 7, an up-and-down direction and a left-and-right direction of the linear-motion actuator are expressed as an up-and-down direction and a left-and-right direction in the figures.

Figure 6:
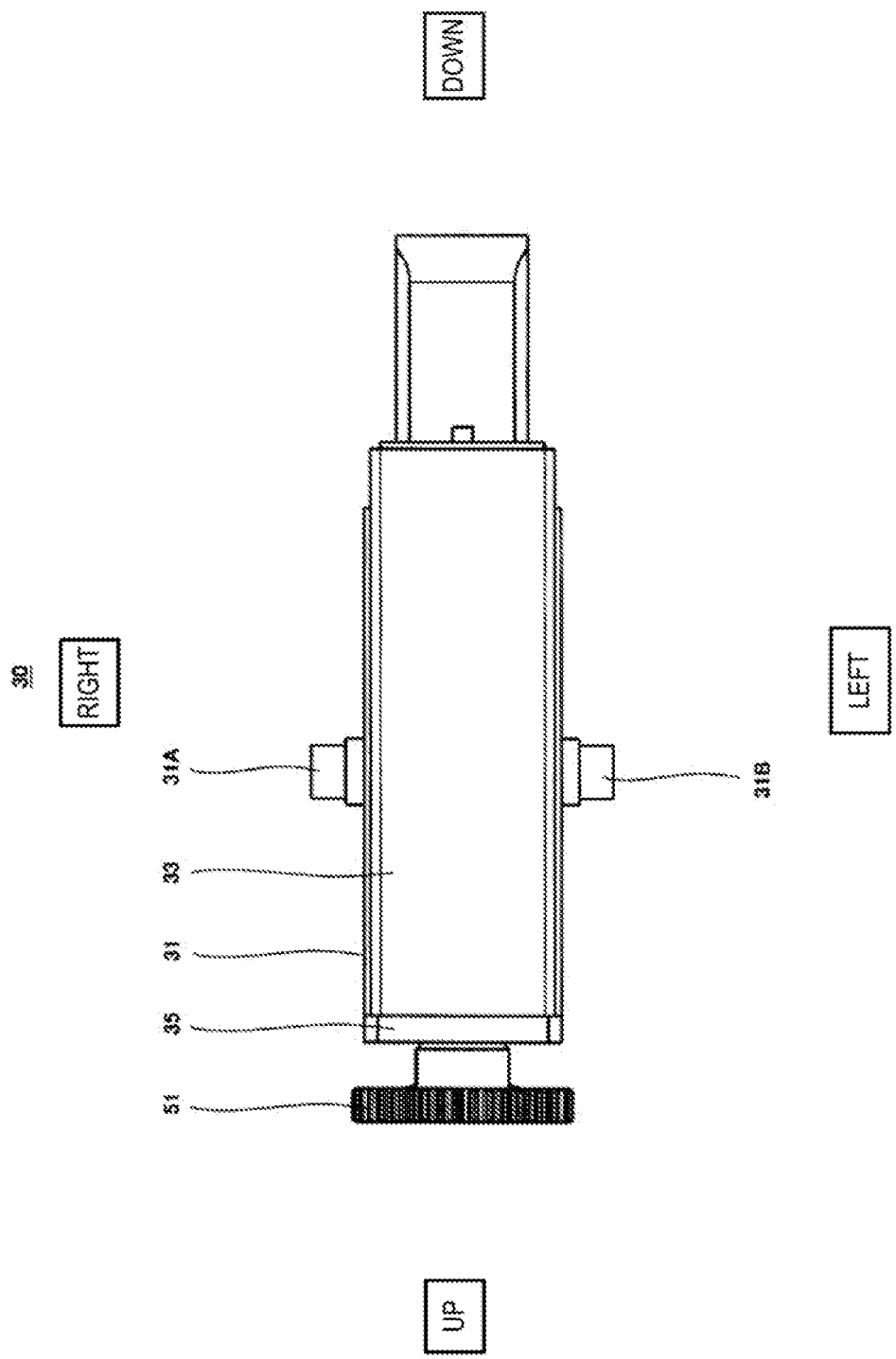
FIG. 6 is an upper surface of the linear-motion actuator illustrated in FIG. 5.
Figure 7:
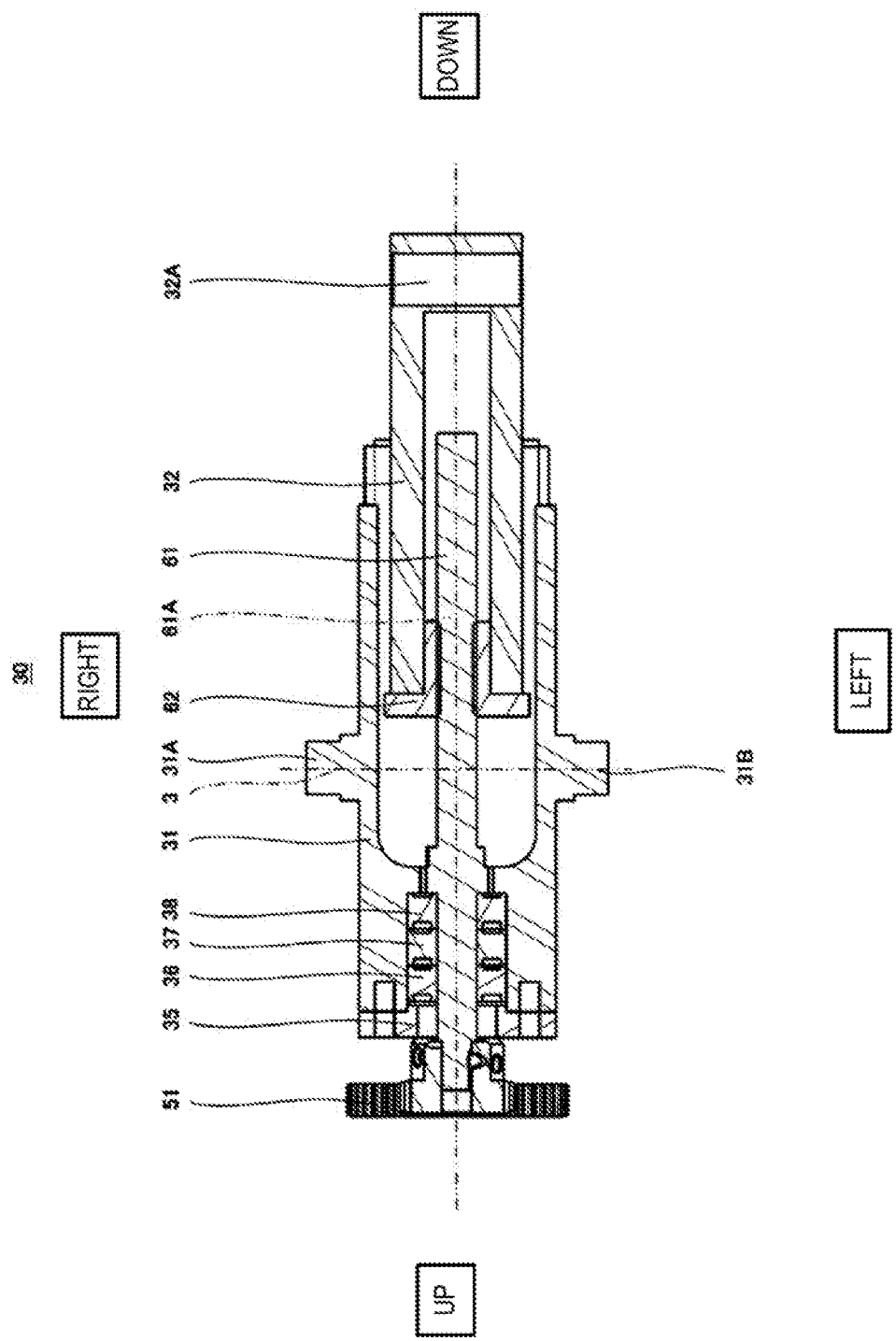
FIG. 7 is a cross-sectional view taken along a line A-A in FIG. 5.

As illustrated in FIGS. 5 to 7, the first to third casings 31-33 are each formed in a rectangular parallelepiped shape in Embodiment 1. The first casing 31 and the third casing 33 are provided in parallel to each other so that their extending directions become parallel to each other. The second casing 32 is disposed so that an outer circumferential surface thereof slides on an inner circumferential surface of the first casing 31.

The pair of first shaft parts 31A and 31B are disposed on an outer surface of the first casing 31. For example, the first shaft part 31A is disposed on the right surface of the first casing 31, and the first shaft part 31B is disposed on the left surface of the first casing 31. The first shaft part 31A and the first shaft part 31B are formed so that their axial centers become coaxial with each other, and in Embodiment 1, they are formed so that the axial centers are oriented in the left-and-right direction. Moreover, the first shaft part 31A and the first shaft part 31B are disposed so that the axial centers 3 are located on an axial center 61A of the threaded shaft 61 (see FIG. 7). In more detail, in Embodiment 1, when seen horizontally (left-and-right direction), and the first shaft part 31A and the first shaft part 31B are disposed so as to overlap with the threaded shaft 61. Further, the first shaft part 31A and the first shaft part 31B are integrally formed with the first casing 31.

Moreover, base ends (upper ends in FIG. 5 and other figures) of the first casing 31 and the third casing 33 are closed by a lid member 35. A first through-hole 35A is formed in a rear side part of the lid member 35, and a second through-hole 35B is formed in a front side part of the lid member 35 (see FIG. 1).

An output shaft of the drive motor is inserted into the first through-hole 35A, and the first rotary transmission member 51 is fixed to the output shaft. The drive motor may be, for example, a servo motor which is servo-controlled by the control device 101 which will be described later. Moreover, the third casing 33 is provided with a rotation sensor (not illustrated) which detects a rotational position of the drive motor, and a current sensor (not illustrated) which detects current for controlling the rotation of the drive motor. The rotation sensor may be, for example, an encoder.

Moreover, a base-end part of the threaded shaft (shaft member) 61 is inserted into the second through-hole 35B, and the second rotary transmission member 52 is fixed to the base-end part of the threaded shaft 61. Note that a bearing member (e.g., a ball bearing etc.) which rotatably supports the threaded shaft 61 may be disposed in the second through-hole 35B.

The first rotary transmission member 51 meshes with the second rotary transmission member 52, and the rotation of the electric motor is transmitted to the second rotary transmission member 52 (as a result, the threaded shaft 61) through the first rotary transmission member 51. The first rotary transmission member 51 and the second rotary transmission member 52 may be, for example, gears.

Note that, in Embodiment 1, although the first rotary transmission member 51 meshes with the second rotary transmission member 52 to transmit the rotation of the drive motor, it is not limited to this structure and any other transmission mechanism may be used, which can transmit the rotation of the drive motor. For example, the first rotary transmission member 51 and the second rotary transmission member 52 are constituted by pulleys, and a belt is wound around the pulleys to transmit the rotation of the drive motor.

Moreover, stationary members 36-38 are fixed to an upper end part of the inner circumferential surface of the first casing 31. Coaxial through-holes are formed in the stationary members 36-38, and the base-end part of the threaded shaft 61 is fittedly inserted into the through-hole. Thus, the threaded shaft 61 is rotatably fixed to the first casing 31.

Thread groove is formed in an outer surface of the tip-end part of the threaded shaft 61 (not illustrated). The nut member 62 is disposed so as to threadedly engage with the thread groove. Note that, since the nut member 62 is constructed similar to a nut member of a known ball screw mechanism, the detailed description is omitted.

A base-end part of the second casing 32 is fixed to the nut member 62. The base end of the second casing 32 is opened, and the tip-end part of the threaded shaft 61 is inserted therein. Moreover, a tip-end part of the second casing 32 is closed, and a through-hole 32A extending in the left-and-right direction is formed therein. As described above, the first shaft member 41 is fittedly inserted into the through-hole 32A.

In the joint structure 100 of the robot according to Embodiment 1, the control device 101 controls the drive motor to cause the linear-motion actuator 30 to perform the reciprocating operation. As a result, a distance between the first shaft part 31A and the first shaft member 41 is changed to pivot the first link 10 with respect to the second link 20.

Next, a configuration of the control device 101 will be described with reference to FIG. 8.

Figure 8:
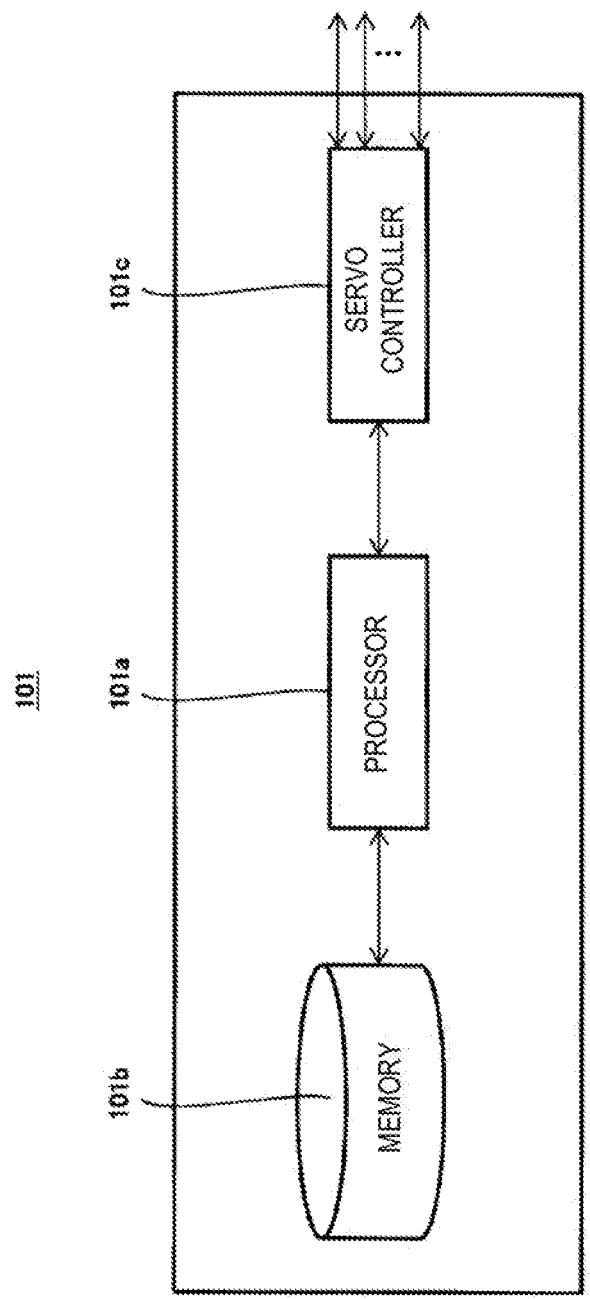
FIG. 8 is a functional block diagram schematically illustrating a configuration of a control device in the joint structure for the robot illustrated in FIG. 1.

FIG. 8 is a functional block diagram schematically illustrating the configuration of the control device in the joint structure for the robot illustrated in FIG. 1.

As illustrated in FIG. 8, the control device 101 includes a processor 101a, such as a CPU, a memory 101b, such as a ROM and/or a RAM, and a servo controller 101c. The control device 101 is, for example, a robot controller provided with a computer, such as a microcontroller.

Note that the control device 101 may be comprised of a single control device 101 which carries out a centralized control, or may be comprised of a plurality of control devices 101 which collaboratively carry out a distributed control. Moreover, in Embodiment 1, although the memory 101b is disposed inside the control device 101, it is not limited to this structure, and the memory 101b may be provided separately from the control device 101.

Information on a basic program as the robot controller, various fixed data, etc. are stored in the memory 101b. The processor 101a controls various operations of the robot by reading and executing software, such as the basic program, stored in the memory 101b. That is, the processor 101a generates a control command for the robot, and outputs it to the servo controller 101c. The servo controller 101c controls the drive of the servo motors provided to respective joints based on the control commands generated by the processor 101a.

[Operation and Effects of Joint Structure of Robot]

Next, operation and effects of the joint structure 100 according to Embodiment 1 are described.

First, as illustrated in FIG. 2, suppose that the first link 10 is in a state where it stands up (upright). The processor 101a of the control device 101 reads a given program stored in the memory 101b, and drives the drive motor so that the nut member 62 moves to the tip-end part side of the threaded shaft 61.

Thus, the second casing 32 of the linear-motion actuator 30 moves so as to be separated from the first casing 31, thereby extending the linear-motion actuator 30. Accordingly, the distance between the first shaft part 31A and the first shaft member 41 increases. In connection with this, the first link 10 pivots with respect to the second link 20 so that the tip-end part thereof faces downward, and as illustrated in FIG. 3, the first link 10 becomes in a state where it is inclined.

On the other hand, as illustrated in FIG. 3, when the first link 10 is in the inclined state, the control device 101 drives the drive motor so that the nut member 62 moves to the base-end part side of the threaded shaft 61. Then, the second casing 32 of the linear-motion actuator 30 moves toward the first casing 31, thereby contracting the linear-motion actuator 30. In connection with this, the first link 10 is pivoted with respect to the second link 20 so that the tip-end part thereof faces upward, and as illustrated in FIG. 2, the first link 10 becomes in the stand-up state.

In the joint structure 100 of the robot according to Embodiment 1 constructed in this way, the first shaft parts 31A and 31B are formed integrally with the first casing 31. For this reason, as compared with the robot disclosed in Patent Document 1, the strength of the first shaft parts 31A and 31B to the first casing 31 can fully be secured.

Moreover, since it is not necessary to increase the thickness of the casing similar to the robot disclosed in Patent Document 1 in order to fully secure the strength of the pivots, the thickness of the first casing 31 can be reduced. Therefore, the robot having the joint structure 100 according to Embodiment 1 can be reduced in the size.

Embodiment 2

In a joint structure for the robot according to Embodiment 2, the linear-motion actuator further includes a drive motor and a rotary transmission member which transmits the rotation of the drive motor to the shaft member, and the casing accommodates the rotary transmission member.

Below, one example of the joint structure for the robot according to Embodiment 2 will be described with reference to FIGS. 9 and 10.

[Structure of Robot]

Figure 9:
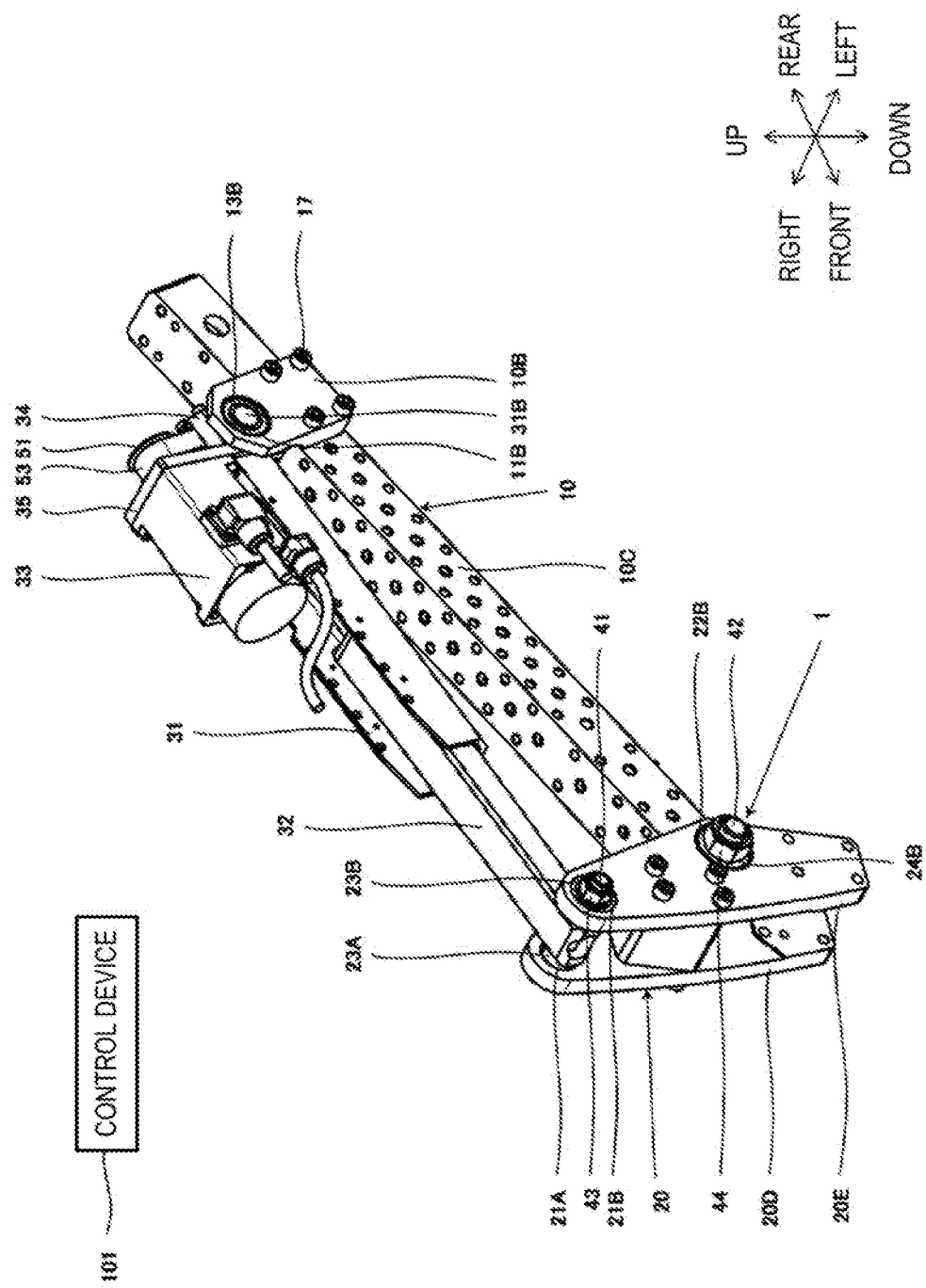
FIG. 9 is a perspective view illustrating an outline structure of a joint structure for a robot according to Embodiment 2.

FIG. 9 is a perspective view illustrating an outline structure of the joint structure for the robot according to Embodiment 2. FIG. 10 is a side view of the joint structure for the robot illustrated in FIG. 9.

Note that, in FIG. 9, an up-and-down direction, a front-and-rear direction, and a left-and-right direction of the joint structure for the robot are expressed as an up-and-down direction, a front-and-rear direction, and a left-and-right direction in the figure. In FIG. 10, the up-and-down direction and the front-and-rear direction in the joint structure for the robot are expressed as an up-and-down direction and a front-and-rear direction in the figure.

Figure 10:
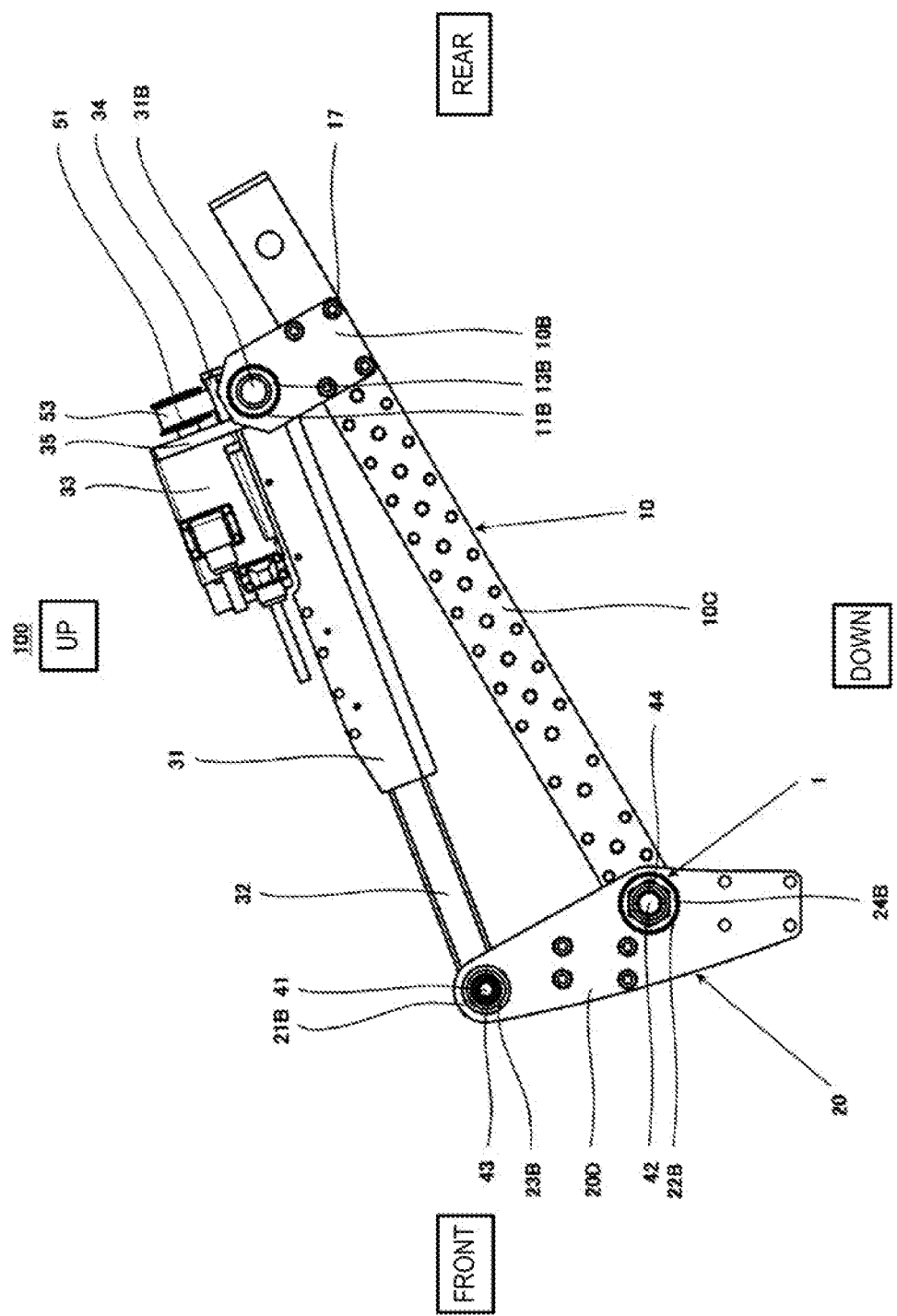
FIG. 10 is a side view of the joint structure for the robot illustrated in FIG. 9.

As illustrated in FIGS. 9 and 10, the joint structure 100 of the robot according to Embodiment 2 is constructed similar to the joint structure 100 of the robot according to Embodiment 1, except for the followings.

The first link 10 has a box-shaped main body 10C disposed so as to be pinched by the pair of first link members 10A and 10B. The main body 10C is disposed so as to be pinched at a base-end part (rear end part) thereof by lower end parts of the first link members 10A and 10B. The lower end parts of the first link members 10A and 10B are fixed to the base-end part of the main body 10C with the bolts 17. Note that the first link member 10A is not illustrated in FIGS. 9 and 10.

Moreover, the first link members 10A and 10B are disposed so as to pinch a fourth casing 34 of the linear-motion actuator 30 which will be described later. For example, the first link members 10A and 10B are disposed so that the first shaft parts 31A and 31B provided to the fourth casing 34 are inserted into the first through-holes 11A and 11B through the bearing members 13A and 13B, respectively.

Thus, the first link member 10A is pivotably supported by the first shaft part 31A, and the first link member 10B is pivotably supported by the first shaft part 31B.

Moreover, the second link 20 has a pair of second link members 20D and 20E. The second link members 20D and 20E are each formed in a strip shape, and they are disposed so as to pinch a tip-end part (front end part) of the main body 10C. The second link members 20D and 20E are disposed so as to also pinch a tip-end part of the second casing 32 of the linear-motion actuator 30.

A second through-hole 22B is formed in a central part of the second link member 20E, and a bearing member 24B is fixedly fitted into the second through-hole 22B. The bearing member 24B may be, for example, a ball bearing etc. Similarly, a second through-hole is formed in a central part of the second link member 20D, and a bearing member is fixedly fitted into the second through-hole 22 (none of them is illustrated). The bearing member may be, for example, a ball bearing etc. Moreover, a through-hole (not illustrated) is formed in a tip-end part of the main body 10C so as to communicate with the second through-hole 22B.

The second shaft member 42 is inserted into the second through-hole of the second link member 20D, the second through-hole 22B of the second link member 20E, and the through-hole of the main body 10C. The second shaft member 42, the second link member 20D, the main body 10C, and the second link member 20E are fastened together with the nut member 44.

Moreover, a first through-hole 21A is formed in an upper end part of the second link member 20D, and the bearing member 23A is fixedly fitted into the first through-hole 21A. Similarly, a first through-hole 21B is formed in an upper end part of the second link member 20E, and the bearing member 23B is fixedly fitted into the first through-hole 21B. Each of the bearing members 23A and 23B may be, for example, a ball bearing etc.

The first shaft member 41 is inserted into the first through-hole 21A, the through-hole 32A of the second casing 32, and the first through-hole 21B. The first shaft member 41, the second link member 20D, the second casing 32, and the second link member 20E are fastened together with the nut member 43.

In the linear-motion actuator 30 of Embodiment 2, the first rotary transmission member 51 and the second rotary transmission member 52 are each comprised of a pulley, and a belt 53 is wound around the pulleys so that the rotation of the drive motor is transmitted.

Moreover, the linear-motion actuator 30 has the fourth casing 34 disposed so as to cover the second rotary transmission member 52. As described above, in Embodiment 2, the first shaft part 31A and the first shaft part 31B are integrally formed with the fourth casing 34 instead of the first casing 31. Moreover, although the first shaft part 31A and the first shaft part 31B are disposed on the axial center 61A of the threaded shaft 61, they are disposed so as not to overlap with the threaded shaft 61 when seen horizontally.

In the joint structure 100 of the robot according to Embodiment 2 constructed in this way, the first shaft part 31A and the first shaft part 31B are integrally formed with the fourth casing 34. For this reason, as compared with the robot disclosed in Patent Document 1, the strength of the first shaft part 31A and the first shaft part 31B to the fourth casing 34 can fully be secured.

Moreover, since it is not necessary to increase the thickness of the casing like the robot disclosed in Patent Document 1 in order to fully secure the strength of the pivots, the thickness of the fourth casing 34 can be reduced. Therefore, the robot having the joint structure 100 according to Embodiment 2 can be reduced in the size.

It is apparent for a person skilled in the art that many improvements or other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

Since the joint structure for the robot of the present disclosure can reduce the size of the robot, it is useful in the field of industrial robots.

DESCRIPTION OF REFERENCE CHARACTERS

1 Joint Part
3 Axial Center
10 First Link
10A First Link Member
10B First Link Member
10C Main Body
11A First Through-Hole
11B First Through-Hole
12A Second Through-Hole
12B Second Through-Hole
13A Bearing Member
13B Bearing Member
14A Bearing Member
14B Bearing Member
16 Stationary Member
17 Bolt
20 Second Link
20A Base Part
20B Stepped Part
20C Wall Part
20D Second Link Member
20E Second Link Member
21 First Through-Hole
21A First Through-Hole
21B First Through-Hole
22 Second Through-Hole
22B Second Through-Hole
23 Bearing Member
23A Bearing Member
23B Bearing Member
24B Bearing Member
30 Linear-Motion Actuator
31 First Casing
31A First Shaft Part
31B First Shaft Part
32 Second Casing
32A Through-Hole
33 Third Casing
34 Fourth Casing
35 Lid Member
35A First Through-Hole
35B Second Through-Hole
36 Stationary Member
41 First Shaft Member
42 Second Shaft Member
43 Nut Member
44 Nut Member
45A Collar
45B Collar
51 First Rotary Transmission Member
52 Second Rotary Transmission Member
53 Belt
61 Threaded Shaft
61A Axial Center
62 Nut Member 100 Joint Structure
101 Control Device
101*a* Processor
101*b* Memory
101*c* Servo Controller

The invention claimed is:

1. A joint structure for a robot, comprising:
 a first link and a second link rotatably coupled to each other through a joint part; and
 a linear-motion actuator coupling the first link to the second link at a part separated from the joint part,
 wherein the linear-motion actuator has a casing, and a pair of first shaft parts integrally formed with an outer surface of the casing,
 wherein the first link is supported by the first shaft parts so as to be pivotable with respect to the linear-motion actuator, and
 wherein the first link pivots relative to the second link by the linear-motion actuator reciprocating,
 wherein the first link has a pair of first link members, and
 wherein the pair of first link members are disposed so as to pinch the casing of the linear-motion actuator.

2. The joint structure of claim 1, wherein a through-hole is formed in each of the first link members,
 wherein a bearing member is disposed in each of the through-holes, and
 wherein the first link is pivotably supported by the first shaft parts through the bearing members.

3. The joint structure of claim 1, wherein the casing accommodates a shaft member.

4. The joint structure of claim 1, wherein
 the linear-motion actuator further has a drive motor, and a rotary transmission member configured to transmit rotation of the drive motor to a shaft member, and
 wherein the casing accommodates the rotary transmission member.

* * * * *